United States Patent

[11] 3,608,861

[72] Inventors David A. Helman
  Berlin;
  Michael E. Miles, Northborough; James F. Donnelly, Worcester, all of Mass.
[21] Appl. No. 732,729
[22] Filed May 28, 1968
[45] Patented Sept. 28, 1971
[73] Assignee Jamesbury Corporation
  Worcester, Mass.

[54] BUTTERFLY VALVE SEAT
  9 Claims, 3 Drawing Figs.
[52] U.S. Cl. .................................................. 251/173,
  251/306, 251/317
[51] Int. Cl. .................................................. F16k 5/16
[50] Field of Search .......................................... 251/173,
  175, 305, 317, 306

[56] References Cited
  UNITED STATES PATENTS
2,893,682 7/1959 Hintzman ..................... 251/173
3,077,332 2/1963 Burtis ........................... 251/173
3,307,633 3/1967 Newall ......................... 251/175 X Primary Examiner—Harold W. Weakley
Attorneys—Robert F. Conrad and Kurt Shaffert ABSTRACT: In a butterfly valve of the type wherein an annular flexible seat ring circumscribing the fluid flow channel cooperates with an inclined circumferential sealing surface on a rotatably mounted butterfly disc to open and close the flow channel, an improvement is made to permit the valve to resist internal fluid pressure with equal effectiveness regardless of the direction from which applied. The disc deflects in the downstream direction to the same extend upon the application of a given fluid pressure (up to the design pressure of the valve) regardless of the direction from which the pressure is applied; whereas the annular flexible seal tends to deflect to a greater extent than this when the pressure is applied from the direction of convergence of the inclined circumferential sealing surface and to a lesser extent than this when the internal fluid pressure is applied from the opposite direction.

PATENTED SEP 28 1971
3,608,861
FIG. 1
FIG. 2
FIG. 3
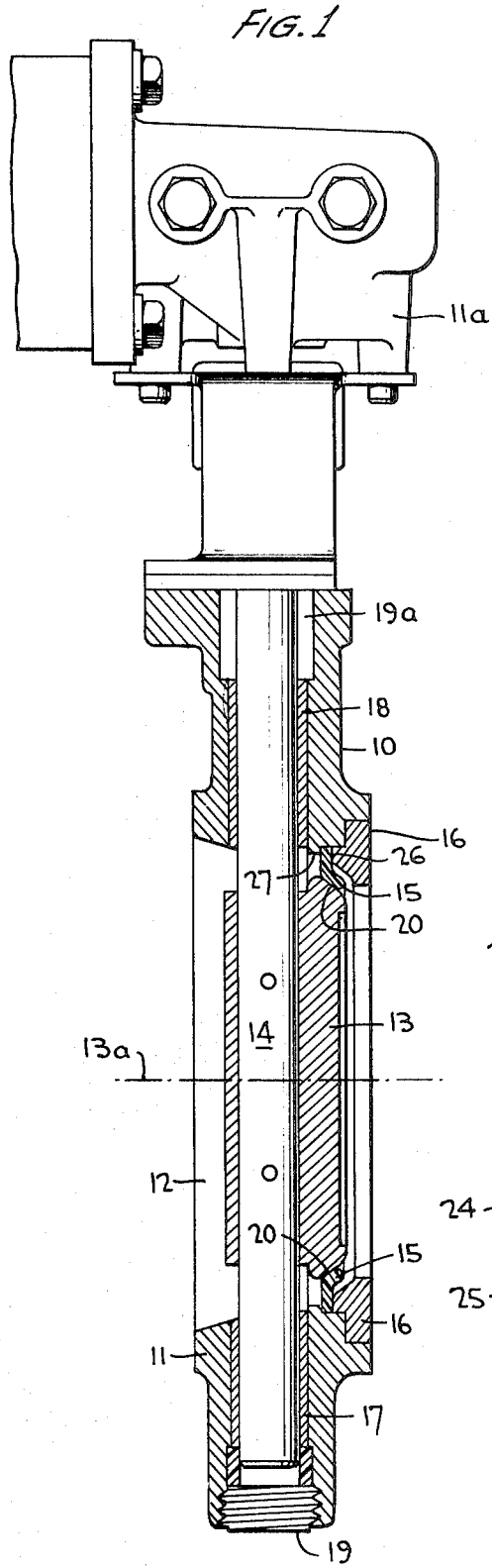
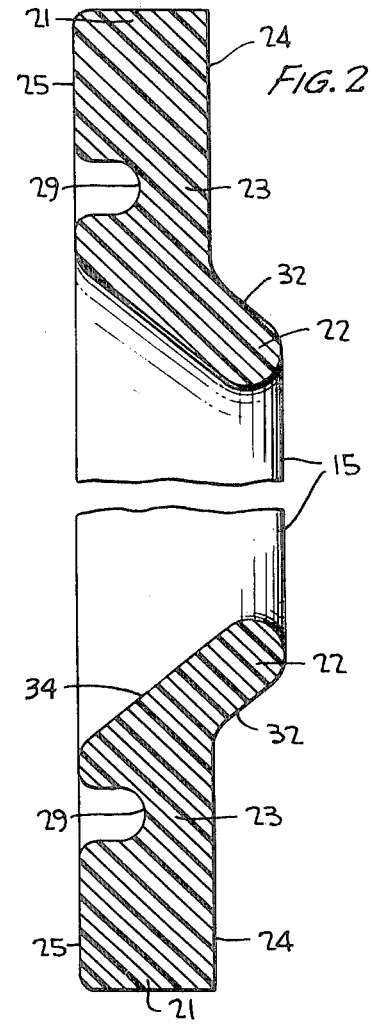
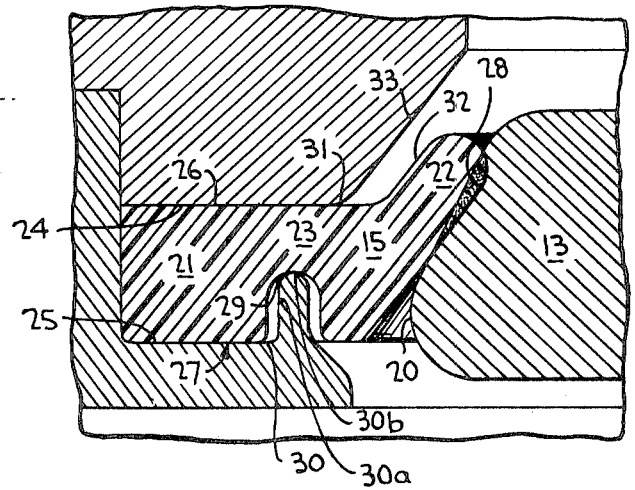
INVENTORS,
DAVID A. HELMAN
MICHAEL E. MILES
JAMES F. DONNELLY

BUTTERFLY VALVE SEAT

BACKGROUND OF THE INVENTION

This invention relates to rotary fluid control valves of the butterfly type wherein a disc is mounted for rotation between the open position, in which the disc lies substantially parallel to the axis of the fluid flow channel through the valve, and the closed position in which the disc lies perpendicularly to this axis. The disc cooperates with an annular flexible seat circumscribing the fluid flow channel to shut off fluid flow through the channel. More particularly, the invention relates to such valves in which the action of the internal fluid pressure acting upon the valve serves to improve the cooperation between the flexible seat and the disc, that is wherein increased fluid pressure actually tends to reduce the likelihood of fluid leakage past the valve.

Although butterfly valves of the general configuration of those disclosed by White in U.S. Pat. No. 2,980,388 and Swain in U.S. Pat. No. 3,282,558 have found acceptance for certain types of service, these valves are nevertheless considered limited-service valves because of a number of disadvantages from which they inherently suffer.

Hintzman et al. in U.S. Pat. No. 2,893,682 disclose a valve construction wherein the circumferential sealing surface and the flexible seat are contoured to complement each other and make mere sliding contact in the absence of internal fluid pressure. The application of such fluid pressure from the direction of convergence of the sealing surface on the butterfly disc forces the flexible seat into more intimate contact with the sealing surface on the disc so as to reduce leakage. When the fluid pressure is applied from the opposite direction to this valve, however, the flexible seat tends to be lifted away from the circumferential sealing surface permitting fluid to leak past the valve. The patentees point out that this feature is actually useful when the valve is employed in one special type of service, i.e. to control the flow of a highly volatile fluid which tends to build up gas pressure as it is warmed. In general, however, it is more desirable, and for many types of service absolutely necessary, to provide a valve which will resist fluid pressure regardless of the direction from which it is applied.

It is an object of this invention to provide an improved butterfly valve capable of service in a system wherein internal fluid pressure may be applied from either direction to the valve.

It is a further object of this invention to provide an improved butterfly valve in which fluid pressure acts upon the valve to improve the sealing effectiveness thereof, regardless of the direction from which the fluid pressure is applied.

Yet another object of this invention is to provide an improved butterfly valve in which sealing occurs by virtue of deflection, including compression and flexing, of the seat and in which this sealing action is fortified by the action of internal fluid pressure upon the valve, regardless of the direction from which this fluid pressure is applied.

Still another object of this invention is to provide a flexible set for rotary fluid valves which will be compressed to form a tighter seal by the action of fluid pressure, regardless of the direction from which this pressure is applied.

These and other objects and advantages of the invention, and the manner of their attainment, will become apparent to those skilled in this art from a consideration of this specification when taken in conjunction with the appended drawings.

SUMMARY OF THE INVENTION

The improvement of this invention is particularly applicable to butterfly valves wherein a butterfly disc element is mounted for rotation about an axis perpendicular to the axis of the fluid flow channel defined by the valve housing, and wherein an annular flexible seat circumscribing the fluid flow channel is juxtaposed to cooperate with a sealing surface circumscribing the disc. This circumscribing sealing surface is preferably inclined, i.e. it is a segment of a converging surface, convergence occurring at a point on the extension of the fluid flow axis. For instance, the circumscribing sealing surface may be a frustum of a cone or a segment of a sphere or a spheroid. The rotatable mounting of the disc may be a shaft which extends through a packing gland in the valve body to an external valve handle.

The application of internal fluid pressure to either face of the valve disc when the valve is closed inherently causes some deflection of the disc in the direction away from the pressure source. This deflection will be the sum total of the deflections caused by shaft bending, clearance between the shaft and its bearings, compression of the bearings by the shaft, and displacement of the disc relative to the shaft if these two elements are not attached to each other with absolute rigidity. The magnitude of this deflection of the disc will generally be independent of the direction of application of the fluid pressure, and is a function of the magnitude of the resultant internal fluid pressure applied to it (up to the design pressure of the valve).

One way to accomplish such isotropic deflection of the disc, i.e. deflection in response to internal fluid pressure regardless of the direction from which it is applied, is to provide a butterfly element of unitary construction having a disc element and a gudgeon element, the shaft passing through a bore of a gudgeon and being internally connected thereto for mutual rotation.

The other requirement for the achievement of the objectives of this invention is to provide an annular flexible seat which tends to be deflected anisotropically by internal fluid pressure, i.e. which tends to be deflected to a greater extent by the application of internal fluid pressure (up to the design pressure of the valve) when that pressure is being applied from the direction in which the circumscribing sealing surface converges and to a lesser extent when the internal fluid pressure is being applied from the opposite direction. The tendency of this seat to deflect in response to fluid pressure emanating from the direction of convergence is desirably greater than the tendency of the disc to deflect, but the tendency of the seat to deflect in response to fluid pressure when it emanates from the opposite direction is desirably less than the tendency of the disc to deflect.

It will be seen that application of fluid pressure from the direction of convergence will cause the inevitable downstream displacement of the valve disc. But, when the above-stated criteria are met, this application of internal fluid pressure will cause the flexible seat to tend to be displaced downstream by an even greater amount, forcing the latter into even tighter relationship with the circumscribing sealing surface and improving the sealing effectiveness of the valve as compared to before the application of this fluid pressure. On the other hand, when internal fluid pressure is applied to the valve from the opposite direction, the disc will be displaced toward the direction of convergence by a certain magnitude by the flexible seat will tend to be displaced in that direction to only lesser extent, thereby again increasing the sealing effectiveness of the valve as internal fluid pressure increases.

It is desirable that the flexible annular seat be positioned in relation to the sealing surface of the disc so that even in the absence of internal fluid pressure the seat tends to be deflected by the sealing surface when the disc is in the closed position, i.e. that seat is compressed by virtue of being an interfering location with respect to the sealing surface of the disc. The action of these cooperating parts in response to the application of internal fluid pressure, described above, then serves to reinforce the initial sealing action, thereby providing a butterfly valve which seals positively and effectively against fluid leakage in all ranges of internal fluid pressure and regardless of the direction of application of this pressure.

A number of ways of achieving the required directionally selective deflection property in the flexible seat means will be disclosed herein although it will be understood that other ways of achieving such directional selectivity or anisotropicity are applicable to this invention.

The flexible annular seat may conveniently be a ring of elongated cross section having an annular outer portion adapted to be dripped and restrained by rigid elements of the valve disposed on either side of it and immediately adjacent thereto. The inner portion of this flexible seat, i.e. the portion adjacent to the annular opening thereof, is unrestrained and free to be deflected by contact with the sealing surface of the disc, or by the action of internal fluid pressure, or both. The portion of the seat connecting this inner portion with the outer portion may be thought of as a linking portion.

In one embodiment of the invention the rigid gripping element of the valve disposed on the same side of the flexible seat as the direction of convergence contacts the annular seat from the radial outside extremity thereof toward the center thereof over a greater proportion of the radius of the seat than does the corresponding rigid element on the other side of the flexible seat. As a result, deflection of the radially inner portion of the seat in response to fluid pressure from the direction of convergence will occur by flexing about a fulcrum (the radially annular inner terminus of the rigid element) further from the center of the annular seat (i.e. the flow axis) than is the fulcrum for flexing in the opposite direction. Reflection about either fulcrum distorts the flexible seat into a configuration with a given radius of curvature. A configuration with a relatively small radius of curvature is more highly distorted than one with a relatively large radius of curvature. The more remote from the center of the annular seat (i.e. the flow axis) that the fulcrum for flexing the flexible seat is located, the more readily the seat can deflect and the greater will be the radius of the curvature of the configuration which is imparted to the seat. Therefore, the seat will tend to deflect more readily away from the direction of convergence than toward it.

In another embodiment, a rigid compression surface is juxtaposed adjacent to the inner portion of the seat and on the same side thereof as the direction of convergence. The location of this compression surface is such that incipient deflection of the seat in the direction of convergence (such as would be induced by internal fluid pressure emanating from the opposite direction) will bring the annularly inner portion of the seat into contact with it. Further deflection of the seat in the same direction compresses the seat against this compression surface, so that it has only a slight tendency to deflect in this direction. On the other hand, there being no compression element correspondingly located on the other side of the seat, the ability of the seat to tend to deflect in that direction is not so limited.

In a third embodiment of the invention the anisotropic tendency of the seat to deflect is accomplished by exposing different amounts of area on the respective faces of the flexible seat to the resultant force created by internal fluid pressure. Inasmuch as this resultant force which causes the deflection in the flexible seat referred to is force in the direction of the flow axis, the significant area for this purpose is the projection of the actual area of the seat exposed to this pressure projected upon a plane normal to the flow axis to the valve. If the projection of this area upon such a plane on the side of the valve in the direction of convergence is sufficiently greater than that on the other side, the desired directionally differential effect is obtained.

Combinations of these effects, or other means either singly or in combination with each other or with the means here described may be employed to achieve the requisite anisotropic tendency of the seat to deflect. Thus, for instance, the seat may be constructed to be of graduated stiffness from one surface to the other thereof. Such graduation may be accomplished by a gradation of material properties. The seat may be constructed of any material having the requisite flexibility properties, i.e. a stiffly flexible material. Fluorine-containing polymers such as tetrafluoroethylene are highly suitable. In some instances, metals with sufficient springiness may be preferred. Unlike many butterfly valve designs of the prior art, the valves incorporating the improvements of the instant invention do not require that the seat material be elastomeric, such as seats made of natural or synthetic rubber.

BRIEF DESCRIPTION OF THE DRAWINGS

FIG. 1 is an elevation, partially in cross section, of a butterfly valve of the improved type disclosed in this application.

FIG. 2 is a cross-sectional representation of a portion of an annular flexible seal which may be employed in the improved valve of the instant invention.

FIG. 3 is an enlarged cross-sectional representation of the zone of cooperation between the annular seat and the sealing surface on the disc of the improved valve of the instant invention shown in FIG. 1.

DESCRIPTION OF A PREFERRED EMBODIMENT OF THE INSTANT INVENTION

Depicted in FIG. 1 is a valve 10 shown optionally equipped with motorized valve operator 11a, the details of which are not relevant to this invention. Valve 10 is comprised of valve housing 11 defining flow channel 12 of circular cross section therethrough, butterfly disc 13 mounted for rotation with shaft 14, annular flexible seat 15 and seat retainer ring 16.

The fluid flow channel 12 has an imaginary flow axis indicated at 13a. Shaft 14 is essentially perpendicular to flow axis 13a. The shaft 14 is mounted for rotation in valve housing 11 with the aid of lower bearing means 17 and upper bearing means 18, neither of which is shown in detail. Plug 19 is inserted in the bottom of the shaft bore to prevent the escape of internal fluid pressure. Stuffer box means 19a, also not shown in detail, permit the emergence of shaft 14 from the upper end of valve housing 11 without the loss of internal fluid pressure.

Butterfly disc 13 is surrounded by circumferential sealing surface 20. This sealing surface is inclined with respect to flow axis 13a. Another way of describing sealing surface 20 is by pointing out that it is a segment of a larger geometric (i.e. imaginary rather than concretely present) surface which converges at a point located substantially along the extension of flow axis 13a. As viewed in FIG. 1, circumferential sealing surface 20 of disc 13 converges toward the right, and this will be referred to as the direction of convergence.

FIG. 3 shows, in enlargement, that portion of the valve in which the cooperation between sealing surface 20 of disc 13 and flexible annular seat 15 must occur. It will be recognized that in FIG. 3 the direction of convergence is upward, i.e. toward the top of the drawing.

The flexible annular seat 15 has an annularly outer portion 21, and an annularly inner portion 22 which are joined by linking portion 23. It will be seen that outer portion 21 has parallel surfaces 24 and 25 adapted to be gripped and restrained by adjacent rigid elements 26 and 27 respectively. As may be seen from FIG. 1, rigid element 26 is a surface of seat retainer ring 16 and rigid element 27 is a surface of valve housing 11.

Inner portion 22 of annular flexible seat 15 is shown in FIG. 3 in its totally undeflected position, i.e. in the position which it would occupy if disc 13 were rotated out of contact into the open position. It will be understood from the overlap 28, shown in FIG. 3 in dark shading to exist between annular seat 15 and disc 13, that a force fit exists between these elements. That is, when disc 13 is rotated into the closed position, an incipient deflection of seat 15 occurs, assuring positive sealing of the valve even in the absence of internal fluid pressure.

Deflection on inner portion 22 of valve seat 15 occurs mainly by virtue of flexure at linking portion 23 of the seat. To accommodate this flexure, linking portion 23 is deeply relieved at 29.

Upon application of internal fluid pressure from the direction of convergence, i.e. from the right in FIG. 1 or from the top of FIG. 3, disc 13 is displaced in a downstream direction (i.e. to the left in FIG. 1 or downward in FIG. 3) by a magnitude which is a function of the magnitude of the internal fluid pressure. Those skilled in this art will readily understand that this function can be influenced by suitable selection of the compressibility and other properties of bearings 17 and 18, design of the proper clearance between shaft 14 and bearings 17 and 18, the rigidity of shaft 14 and by suitable design of the connecting means between disc 13 and shaft 14.

This same application of fluid pressure will cause annular flexible seat 15, and more specifically inner portion 22 thereof, to tend to deflect in a downstream direction in a magnitude greater than the deflection of disc 13. In so doing, inner portion 22 of seat 15 will be compressed with greater force than theretofore against circumferential sealing surface 20, thereby reinforcing the sealing effect which existed by virtue of the interference fit between these two elements before the application of internal fluid pressure.

If, alternatively, the fluid pressure applied to the valve emanates from the direction opposite to the direction of convergence (i.e. from the left in FIG. 1 or from the bottom in FIG. 3) disc 13 will again be displaced in a downstream direction (not to the right in FIG. 1 and to the top in FIG. 3) by a magnitude related to the magnitude of the internal fluid pressure. Inner portion 22 of annular seat 15, however, tends to be deflected in the downstream direction by a lesser magnitude than the displacement of disc 13. This again causes an increase in the degree compression of seat 15 by annular sealing surface 20 as the internal fluid pressure is increased.

The reason why inner portion 22 of annular seat 15 tends to be deflected more in response to the application of internal fluid pressure when that application is from the direction of convergence than when it is from the opposite direction may be understood by a consideration of FIG. 3. It will be seen that deflection of inner portion 22 in response to fluid pressure emanating from the direction of convergence (i.e. from the top) is accomplished by the downward flexure of linking portion 23 using the point 30b on ring embossment 30a on rigid element 27 as a fulcrum. On the other hand, if fluid pressure is applied from the opposite direction, deflection of inner portion 22 would have to occur by virtue of flexure of linking portion 23 about point 31 on rigid surface 26 on seat retainer ring 16 as a fulcrum. Fulcrum 30b is, of course, measurably further from the center of annular seat 15 (and of disc 13) than is fulcrum 31, so that deflection in an upward direction must occur by virtue of flexure to a configuration of a measurably smaller radius of curvature than when the internal fluid pressure is applied from the top.

Although it is the cooperation between seating surface 34 of the inner portion 22 of seat 15 with circumferential sealing surface 20 of the disc which provides the sealing action of the valve, the relationship between surface 32 on the back of inner portion 22 and rigid surface 33 on rigid element 26 also plays an important role in the functioning of the improved valves of this invention. As has already been stated, inner portion 22 is shown in FIG. 3 in the position it would occupy when disc 13 is in the open position. When disc 13 is closed, inner portion 22 is deflected slightly so that surface 32 thereof comes closer to surface 33 without touching it. However, further upward deflection of inner portion 22, such as would be caused by the application of internal fluid pressure emanating from the direction opposite to the direction of convergence (i.e. from the bottom) would cause surfaces 32 and 33 to come into still closer proximity until they finally contact each other, whereafter any further application of internal fluid pressure from the same direction would cause compression of inner element 22 of annular seat 15. The distance by which surfaces 32 and 33 are spaced apart must be sufficient to permit not only the displacement of inner portion 22 accompanying the closing of disc 13 described above, but also the thermal expansion of the components which may be encountered within the temperature service range for which the valve is designed.

Yet another factor which contributes to the anisotropic tendency of annular seat 15 to deflect, depending upon the direction of application of internal fluid pressure, is the effective area upon which that fluid pressure acts. When the internal fluid pressure is applied from the direction of convergence (i.e. from the top), this fluid pressure acts upon seat 15 from the point of contact thereof with disc 13 back past fulcrum 31. When the fluid pressure emanates from the opposite direction, the area upon which it acts runs from the lowest point of contact between seat 15 and disc 13 somewhat beyond point 30. Internal fluid pressure acting on a given segment of seat area can have one of two types of effect. If the given segment of seat area is supported, i.e. if the surface opposite thereto abuts a rigid surface, it will merely be compressed. On the other hand, segments of seat which are unsupported will be flexed in a downstream direction by a resultant force which is the product of the magnitude of the pressure times the projection of the area of the unsupported segment of the seat on a plane perpendicular to the flow axis (in FIG. 3, any horizontal plane). If this product is greater for pressure applied from the direction of convergence (i.e. from the top) than in the opposite direction, the desired anisotropicity of the annular flexible seat will result.

We claim:

1. In a butterfly valve comprising
   annular flexible seat means circumscribing the fluid flow channel defined by the interior surfaces of a valve housing,
   a disc mounted in said valve housing for rotation about an axis substantially perpendicular to the flow axis of said fluid flow channel, and
   a circumferential sealing surface on said disc cooperating with said seat means to block the flow of fluid through said fluid flow channel when said disc is rotated into the closed position, said sealing surface being a segment of a substantially converging surface,
   the improvement comprising:
      providing annular flexible seat means which tend to deflect more than the said disc in the downstream direction when internal fluid pressure of a given magnitude is applied from the direction of convergence of said sealing surface and which also tend to deflect less than said disc when said fluid pressure is applied from the opposite direction,
      whereby internal fluid pressure, regardless of the direction from which it is applied, increases the sealing effectiveness of said seat means on said disc.

2. The improvement of claim 1 wherein said annular flexible seat means comprise an annular outer element adapted to be constrained between adjacent surfaces of the elements constituting said valve, an inner element disposed within said annulus of said outer element and containing an inclined seating surface adapted to seat against said convergent circumferential sealing surface on said disc, and a flexible linking element joining said inner element to said outer element and permitting said inner element to deflect in a downstream direction in response to the application thereto of fluid pressure emanating from either direction along said fluid flow channel.

3. In a butterfly valve comprising
   annular flexible seat means circumscribing the fluid flow channel defined by the interior surfaces of a valve housing,
   a disc mounted in said valve housing for rotation about an axis substantially perpendicular to the flow axis of said fluid flow channel, an
   a circumferential sealing surface on said disc cooperating with said seat means to block the flow of fluid through said fluid flow channel when said disc is rotated into the closed position, said sealing surface being a segment of a substantially converging surface,
   the improvement comprising:
      providing annular flexible seat means which tend to deflect more than the said disc in the downstream direction when internal fluid pressure of a given magnitude is applied from the direction of convergence of said sealing surface and which also tend to deflect less than said disc when said fluid pressure is applied from the opposite direction,
      whereby internal fluid pressure, regardless of the direction from which it is applied, increases the sealing effectiveness of said seat means on said disc, and wherein said annular flexible seat means comprise an annular outer element adapted to be constrained between adjacent surfaces of the elements constituting said valve, an inner element disposed within said annulus of said outer element and containing an inclined seating surface adapted to seat against said convergent circumferential sealing surface on said disc, and a flexible linking element joining said inner element to said outer element and permitting said inner element to deflect in a downstream direction in response to the application thereto of fluid pressure emanating from either direction along said fluid flow channel, and wherein the deflection of said inner element occurs by virtue of flexure in said linking element about one of a pair of pivot points on said adjacent surface, said pivot point on that side of said annular seat means facing said direction of convergence being located closer to the center of said annular seating means than said pivot point on the other side thereof, whereby internal fluid pressure of a given magnitude tends to deflect said inner element more when applied from the said direction of convergence than when applied from the opposite direction.

4. The improvement of claim 2 wherein a rigid element adjacent to said inner element intercepts said inner element as it tends to deflect in response to internal fluid pressure of a magnitude not greater than the design pressure of said valve and emanating from the direction opposite to said direction of convergence.

5. The improvement of claim 1 wherein a rigid element is located adjacent said flexible annular seat means and on the same side thereof as the said direction of convergence, said rigid element being positioned sufficiently close to said flexible annular seat means to intercept the deflection of said annular flexible seat means in response to internal fluid pressure of a magnitude not greater than the design pressure of said valve and emanating from the direction opposite to said direction of convergence.

6. In a butterfly valve comprising annular flexible seat means circumscribing the fluid flow channel defined by the interior surfaces of a valve housing, a disc mounted in said valve housing for rotation about an axis substantially perpendicular to the flow axis of said fluid flow channel, and a circumferential sealing surface on said disc cooperating with said seat means to block the flow of fluid through said fluid flow channel when said disc is rotated into the closed position, said sealing surface being a segment of a substantially converging surface, the improvement comprising:

providing annular flexible seat means which tend to deflect more than the said disc in the downstream direction when internal fluid pressure of a given magnitude is applied from the direction of convergence of said sealing surface and which also tend to deflect less than said disc when said fluid pressure is applied from the opposite direction, whereby internal fluid pressure, regardless of the direction from which it is applied, increases the sealing effectiveness of said seat means on said disc wherein a rigid element is located adjacent said flexible annular seat means and on the same side thereof as the said direction of convergence, said rigid element being positioned sufficiently close to said flexible annular seat means to intercept the deflection of said annular flexible seat means in response to internal fluid pressure of a magnitude not greater than the design pressure of said valve and emanating from the direction opposite to said direction of convergence, and wherein said rigid element is located in such proximity to said flexible annular seat means as to permit less deflection thereof in said direction of convergence than said flexible annular seat means is free to deflect in the opposite direction.

7. The improvement of claim 1 wherein the projection upon a plane perpendicular to the said flow axis of that portion of the surface of said flexible seat means which is free to flex and is exposed to internal fluid pressure when said pressure is emanating from the direction of convergence contains a greater area than the projection upon the same plane of that portion of the surface of said flexible seat means which is free to flex and is thus exposed when said pressure is emanating from the opposite direction.

8. The improvement of claim 1 wherein said seat means and said circumferential sealing surface are in interference fit in relation to each other in said closed position in the absence of the action of internal fluid pressure on said valve.

9. In a butterfly valve comprising annular flexible seat means circumscribing the fluid flow channel defined by the interior surfaces of a valve housing, a disc mounted in said valve housing for rotation about an axis substantially perpendicular to the flow axis of said fluid flow channel, and a circumferential sealing surface on said disc cooperating with said seat means to block the flow of fluid through said fluid flow channel when said disc is rotated into the closed position, said sealing surface being a segment of a substantially converging surface, the improvement comprising:

providing annular flexible seat means which tend to deflect more than the said disc in the downstream direction when internal fluid pressure of a given magnitude is applied from the direction of convergence of said sealing surface and which also tend to deflect less than said disc when said fluid pressure is applied from the opposite direction, whereby internal fluid pressure, regardless of the direction from which it is applied, increases the sealing effectiveness of said seat means on said disc wherein said annular flexible seat means comprise an annular outer element adapted to be constrained between adjacent surfaces of the elements constituting said valve, an inner element disposed within said annulus of said outer element and containing an inclined seating surface adapted to seat against said convergent circumferential sealing surface on said disc, and a flexible linking element joining said inner element to said outer element and permitting said inner element to deflect in a downstream direction in response to the application thereto of fluid pressure emanating from either direction along said fluid flow channel, and wherein a rigid element adjacent to said inner element intercepts said inner element as it tends to deflect in response to internal fluid pressure of a magnitude not greater than the design pressure of said valve and emanating from the direction opposite to said direction of convergence, and wherein said rigid element is located in such proximity to said inner element as to permit less deflection thereof in said direction of convergence than said inner element is free to deflect in the opposite direction.

UNITED STATES PATENT OFFICE
CERTIFICATE OF CORRECTION

Patent No. 3,608,861                     Dated September 28, 1971

Inventor(s) David A. Helman et al

It is certified that error appears in the above-identified patent and that said Letters Patent are hereby corrected as shown below:

Column 2, line 26 - "a" should be -- the --. (second instance)

Column 2, line 55 - "by" should be -- but --.

Column 2, line 56 - after "only" insert -- a --.

Column 2, line 63 - "that seat" should be -- the seat --.

Column 3, line 3 - "dripped" should be -- gripped --.

Column 3, line 51 - after "by" insert -- the --.

Column 5, line 14 - "not" should be -- now --.

Column 6, line 59 - "an" should be -- and --.

Column 7, line 15 - "surface" should be -- surfaces --.

Signed and sealed this 21st day of March 1972.

(SEAL)
Attest:

EDWARD M. FLETCHER, JR.                ROBERT GOTTSCHALK
Attesting Officer                      Commissioner of Patents